(12) United States Patent
Smith

(10) Patent No.: US 8,305,571 B2
(45) Date of Patent: Nov. 6, 2012

(54) SPECTROSCOPIC APPARATUS AND METHODS

(75) Inventor: Brian John Edward Smith, Dursley (GB)

(73) Assignee: Renishaw PLC, Wotton-Under-Edge (GB)

( * ) Notice: Subject to any disclaimer, the term of this patent is extended or adjusted under 35 U.S.C. 154(b) by 437 days.

(21) Appl. No.: 12/450,520

(22) PCT Filed: May 2, 2008

(86) PCT No.: PCT/GB2008/001582
§ 371 (c)(1),
(2), (4) Date: Sep. 29, 2009

(87) PCT Pub. No.: WO2008/135766
PCT Pub. Date: Nov. 13, 2008

(65) Prior Publication Data
US 2010/0097603 A1    Apr. 22, 2010

(30) Foreign Application Priority Data

May 3, 2007    (GB) .................................. 0708582.2

(51) Int. Cl.
*G01J 3/44* (2006.01)
(52) U.S. Cl. ....................................................... 356/301
(58) Field of Classification Search .................. 356/301, 356/72–73, 326
See application file for complete search history.

(56) References Cited

U.S. PATENT DOCUMENTS

| | | |
|---|---|---|
| 3,625,613 A | 12/1971 | Abell et al. |
| 3,733,131 A | 5/1973 | Mould |
| 3,853,404 A | 12/1974 | Barrett |
| 3,914,055 A | 10/1975 | Wolga et al. |
| 3,999,854 A | 12/1976 | Barrett |
| 4,030,827 A | 6/1977 | Delhaye et al. |
| 4,081,215 A | 3/1978 | Penney et al. |
| 4,195,930 A | 4/1980 | Delhaye et al. |
| 4,397,556 A | 8/1983 | Muller |
| 4,586,819 A | 5/1986 | Tochigi et al. |

(Continued)

FOREIGN PATENT DOCUMENTS

DE    29 35 812 A1    3/1981

(Continued)

OTHER PUBLICATIONS

Nov. 14, 2011 Office Action issued in U.S. Appl. No. 12/458,815.

(Continued)

*Primary Examiner* — Tarifur Chowdhury
*Assistant Examiner* — Abdullahi Nur
(74) *Attorney, Agent, or Firm* — Oliff & Berridge, PLC

(57) ABSTRACT

A sample is illuminated by laser light and the resulting Raman spectrum is dispersed at a high spectral resolution along one or more rows or columns of detector elements of a CCD. The resulting charge is shifted in a direction Y' and binned in an output register of the CCD. The dispersed spectrum is moved along the rows or columns in a direction X', synchronously with the shifting of charge in the output register. Thus, data from a given wavenumber in the spectrum continues to accumulate in the output register during the movement. This enables data from a wide spectrum to be collected at high resolution, without the need to subsequently stitch blocks of data together in a computer, even where the CCD is arranged such that row-by-row transfer of charge towards the output register is orthogonal to the direction of dispersion.

18 Claims, 1 Drawing Sheet

U.S. PATENT DOCUMENTS

| | | | |
|---|---|---|---|
| 4,648,714 A | | 3/1987 | Benner et al. |
| 5,011,284 A | | 4/1991 | Tedesco et al. |
| 5,112,127 A | | 5/1992 | Carrabba et al. |
| 5,153,670 A | | 10/1992 | Jannson et al. |
| 5,164,786 A | | 11/1992 | Delhaye et al. |
| 5,166,813 A | | 11/1992 | Metz |
| 5,173,748 A | | 12/1992 | Bilhorn |
| 5,442,438 A | | 8/1995 | Batchelder et al. |
| 5,689,333 A | * | 11/1997 | Batchelder et al. ........... 356/301 |
| 5,754,291 A | | 5/1998 | Kain |
| 7,265,828 B2 | * | 9/2007 | Levine ......................... 356/326 |
| 2002/0039186 A1 | * | 4/2002 | Rosenberg ................... 356/432 |
| 2003/0048933 A1 | | 3/2003 | Brown et al. |
| 2005/0006595 A1 | | 1/2005 | Goodwin et al. |
| 2009/0310132 A1 | | 12/2009 | Bennett et al. |

FOREIGN PATENT DOCUMENTS

| | | |
|---|---|---|
| DE | 40 17 317 A1 | 12/1991 |
| EP | 0 324 583 A3 | 7/1989 |
| EP | 0 407 773 A2 | 1/1991 |
| EP | 0 442 206 A2 | 8/1991 |
| EP | 0 465 350 A1 | 1/1992 |
| EP | 0 502 752 A1 | 9/1992 |
| FR | 2.130.269 | 11/1972 |
| GB | 1 345 642 | 1/1974 |
| GB | 1 577 198 | 10/1980 |
| GB | 2 241 350 A | 8/1991 |
| JP | A 53-47892 | 4/1978 |
| JP | A 60-53834 | 3/1985 |
| JP | A 60-174934 | 9/1985 |
| JP | A 62-269048 | 11/1987 |
| JP | A 3-116004 | 5/1991 |
| WO | WO 90/07108 | 6/1990 |
| WO | WO 91/11703 | 8/1991 |
| WO | WO 92/17806 | 10/1992 |
| WO | WO 2008/090350 A1 | 7/2008 |
| WO | WO 2008/135766 A1 | 11/2008 |

OTHER PUBLICATIONS

"Holographic Interference Notch Filters for Raman Spectroscopy," Kaiser Optical Systems, Inc., Feb. 1991, pp. 1-3.
Pelletier et al., "Characterization of Holographic Band-Reject Filters Designed for Raman Spectroscopy," Applied Spectroscopy, vol. 45, No. 5, 1991, pp. 765-769.
Denton et al., "Charge-Injection and Charge-Coupled Devices in Practical Chemical Analysis," American Chemical Society, 1983, pp. 133-152.
Insight Brochure, Meridian Instruments, Inc., 1991.
Treado et al., "Hadamard Transform Raman Imaging," Applied Spectroscopy, vol. 42, No. 5, 1988, pp. 897-901.
Treado et al., "Hadamard Transform Raman Microscopy of Laser-Modified Graphite Electrodes," Applied Spectroscopy, vol. 44, No. 8, 1990, pp. 1270-1275.
Govil et al., "Optical Sectioning Raman Microscopy," Applied Spectroscopy, vol. 45, No. 10, 1991, pp. 1604-1606.
Flaugh et al., "Development of a New Optical Wavelength Rejection Filter: Demonstration of Its Utility in Raman Spectroscopy," Applied Spectroscopy, Vo. 38, No. 6, 1984, pp. 847-850.
Asher et al., "Crystalline Colloidal Bragg Diffraction Devices: the Basis for a New Generation of Raman Instrumentation," Spectroscopy, vol. 1, No. 12, 1986, pp. 26-31.
Batchelder, "Multichannel Raman Spectroscopy with a Cooled CCD Imaging Detector," ESN-European Spectroscopy News, vol. 80, 1988, pp. 28, 32 and 34.
Delhaye et al., "Raman Microprobe and Microscope with Laser Excitation," Journal of Raman Spectroscopy, vol. 3, 1975, pp. 33-43.
Karger et al., "Laser Raman Spectrometer for Process Control," Applied Optics, vol. 12, No. 9, Sep. 1973, pp. 2083-2087.
Gajda et al., "Optical Determination of Crystal Axis Orientation in Silicon Fragments," IBM Technical Disclosure Bulletin, vol. 27, No. 7A, Dec. 1984, pp. 3865-3866.
Duncan et al., "Imaging biological compounds using the coherent anti-Stokes Raman scattering microscope," Optical Engineering, vol. 24, No. 2, Apr. 1985, pp. 352-355.
Dhamelincourt, "Laser Molecular Microscope," Lasers in Chemistry, 1977, pp. 48-53.
"Raman Holographic Edge Filters," Physical Optics Corp., Torrance, CA.
"Holographic Notch Filter," Kaiser Optical Systems, Inc., Ann Arbor, MI.
Pitt, "Raman shifts into industry," Physics World, Oct. 1991, pp. 19-20.
Schrader, "Fortschritte in der Technik der Ramanspektroskopie," Chemie-Ingenieur Technik, vol. 17, 1967.
Bergin, "A microscope for Fourier Transform Raman spectroscopy," Spectrochimica Acta, vol. 46A, No. 2, 1990, pp. 153-159.
Bowden et al., "Line-Scanned Micro Raman Spectroscopy Using a Cooled CCD Imaging Detector," Journal of Raman Spectroscopy, vol. 21, No. 1, 1990, pp. 37-14.
Pitt et al., "Engineering aspects and application of the new Raman instrumentation," IEE Proc.-Sci. Meas. Technol., vol. 152, No. 6, Nov. 2005, pp. 241-318 (XP-002483939).
Lankers et al., "A Device for Surface-scanning Micro-Raman Spectroscopy," Applied Spectroscopy, vol. 46, No. 9, Sep. 1992, pp. 1331-1334.
U.S. Appl. No. 08/854,141, filed May 9, 1997 in the name of Batchelder et al.
U.S. Appl. No. 08/574,929, filed Dec. 19, 1995 in the name of Batchelder et al.
International Search Report issued in PCT/GB2008/001582, mailed Aug. 8, 2008.
Deckert et al., "Scanning Multichannel Technique for Improved Spectrochemical Measurements with a CCD Camera and its Application to Raman Spectroscopy," Applied Spectroscopy, vol. 46, No. 2, 1992, pp. 322-328.
Knoll et al., "Improving Spectroscopic Techniques by a Scanning Multichannel Method," Applied Spectroscopy, vol. 44, No. 5, 1990, pp. 776-782.
Carrabba et al., "The Utilization of a Holographic Bragg Diffraction Filter for Rayleigh Line Rejection in Raman Spectroscopy," Applied Spectroscopy, vol. 44, No. 9, 1990, pp. 1558-1561.
Yang et al., "Holographic Notch Filter for Low-Wavenumber Stokes and Anti-Stokes Raman Spectroscopy," Applied Spectroscopy, vol. 45, No. 9, 1991, pp. 1533-1536.
Liu et al., "Multispectral Hadamard Transform Raman Microscopy," Applied Spectroscopy, vol. 45, No. 10, pp. 1717-1720, 1991.
Owen, "Holographic notch filter (HNF)," Proceedings Reprint, Computer and Optically Generated Holographic Optics, SPIE—The International Society for Optical Engineers, vol. 155, Jul. 24-25, 1991.
Puppels et al., "A high-throughput Raman notch filter set," Rev. Sci. Instrum., vol. 61, No. 12, Dec. 1990, pp. 3709-3712.
Laude, "Spectrometre a Deux Fabry-Perot Asservis," Journal de Physique, vol. 28, Nos. 3-4, Mar.-Apr. 1967, pp. C2-322-C2-325. (with English-language abstract).
Rich et al., "Lippmann volume Holographic Filters for Rayleigh Line Rejection in Raman Spectroscopy," Practical Holography V, SPIE, vol. 1461, pp. 2-7.
Written Opinion issued in PCT/GB2008/001582, mailed Aug. 8, 2008.
International Search Report issued in PCT/GB2009/000214, mailed May 8, 2009.
Written Opinion issued in PCT/GB2009/000214, mailed May 8, 2009.
International Search Report issued in PCT/GB2008/000252, mailed Jun. 26, 2008.
Written Opinion issued in PCT/GB2008/000252, mailed Jun. 26, 2008.
Dyer et al.; "Application of Continuous Extended Scanning Techniques to the Simultaneous Detection of Raman Scattering and Photoluminescence from Calcium Disilicates using Visible and Near-Infrared Excitation;" *Journal of Raman Spectroscopy*; 1995; pp. 777-785; vol. 26; John Wiley & Sons, Ltd.
Pommier et al.; "Array Detectors for Raman Spectroscopy;" *Handbook of Vibrational Raman Spectroscopy*; 2002; pp. 1-15; John Wiley & Sons, Ltd.

* cited by examiner

SPECTROSCOPIC APPARATUS AND METHODS

This invention relates to spectroscopic apparatus and methods. It is particularly useful in Raman spectroscopy, though it can equally be used in other forms of spectroscopy, e.g. using fluorescence, narrow-line photoluminescence or cathodoluminescence.

An example of Raman spectroscopic apparatus is shown in U.S. Pat. No. 5,689,333 (Batchelder et al). Light from a laser source is focussed to a spot on a sample. Interaction between the light and the molecules of the sample causes Raman scattering into a spectrum having frequencies and wavenumbers which are shifted relative to the exciting laser frequency. After filtering out the laser frequency, a dispersive device such as a diffraction grating disperses this scattered Raman spectrum across a two-dimensional photodetector array, e.g. in the form of a charge-coupled device (CCD). Different molecular species have different characteristic Raman spectra, and so the effect can be used to analyse the molecular species present. The Raman spectrum can also give other information, such as the local stresses or strains in the sample.

If the apparatus is set up to disperse the spectrum widely across the CCD, to provide high spectral resolution, then only a part of the spectrum can be received at any one time. To acquire data from a wider spectrum, one prior art method is to expose one part of the spectrum onto the CCD for a sufficient time, and then to read all of the data relating to that part of the spectrum from the CCD into a computer. Next the diffraction grating is indexed so that the next part of the spectrum is received by the CCD, sufficient exposure time is allowed, and all the data from that part of the spectrum is read into the computer. The above process is repeated as often as is necessary. However, this step-and-repeat method has a disadvantage during subsequent computer processing of the data, because it can be difficult to stitch together the separate blocks of data acquired from the separate parts of the spectrum. This is especially true if there have been changes in the background light level between the separate exposures, or if other conditions have altered.

U.S. Pat. No. 5,689,333 therefore describes an improved data acquisition method. At a given point in time, a part of a Raman spectrum is dispersed along a row or column of the CCD with the desired high spectral resolution. The diffraction grating is moved so as to scan the spectrum along the column or row of pixels, in the direction of the dispersion. Synchronously with this, the charge accumulated in the CCD from exposure to the spectrum is shifted from one pixel to the next within the row or column. The charge from each wavenumber within the spectrum thus continues to accumulate as the scan proceeds, and is read out sequentially into an output register of the CCD, and thus into the computer.

This method has the advantage of collecting data uniformly, without the need to stitch parts of the spectrum together subsequently in the computer. Furthermore, since each pixel in the spectrum is read out of the CCD only once, readout noise is added to each pixel only once.

The present invention seeks to provide an alternative to the above method, and apparatus for carrying it out. One situation in which an alternative would be useful is where the CCD is mounted in the apparatus such that the direction in which charge is shifted within the CCD lies orthogonal to the direction of spectral dispersion. That situation applies, for example, in the apparatus described in our publication number WO 2008/090350.

One aspect of the present invention provides spectroscopic apparatus comprising:
  a light source for illuminating a sample so as to produce therefrom a spectrum of scattered light;
  a detector for detecting the scattered light; the detector comprising at least one column or row of detector elements each of which accumulate data in accordance with the intensity of light incident thereon, and an output register comprising a row of storage elements for receiving data from the detector elements; and
  a dispersive device for analysing the spectrum received from the sample and dispersing it along the detector;
  wherein:
  the output register is arranged parallel to the direction of dispersion; and
  the apparatus is arranged to move the dispersive device such that the spectrum moves in the direction of dispersion;
  characterised in that the apparatus is also arranged to move the data from one storage element of the output register to the next, synchronously with the movement of the spectrum.

Preferably, the apparatus is arranged to expose the row or column of detector elements to at least a part of the spectrum and to read data from the column or row of detector elements into corresponding storage elements of the output register. The exposure may be repeated and data may be read into corresponding storage elements of the output register while the spectrum moves.

Thus, in contrast to U.S. Pat. No. 5,689,333, the data is moved and accumulated synchronously with the movement of the spectrum, not in the row or column of detector elements, but in the output register. This takes place orthogonally to the direction of any movement of the data from the detector elements towards the output register.

A preferred embodiment of the invention will now be described by way of example, with reference to the accompanying drawings, wherein.

Figure 1:
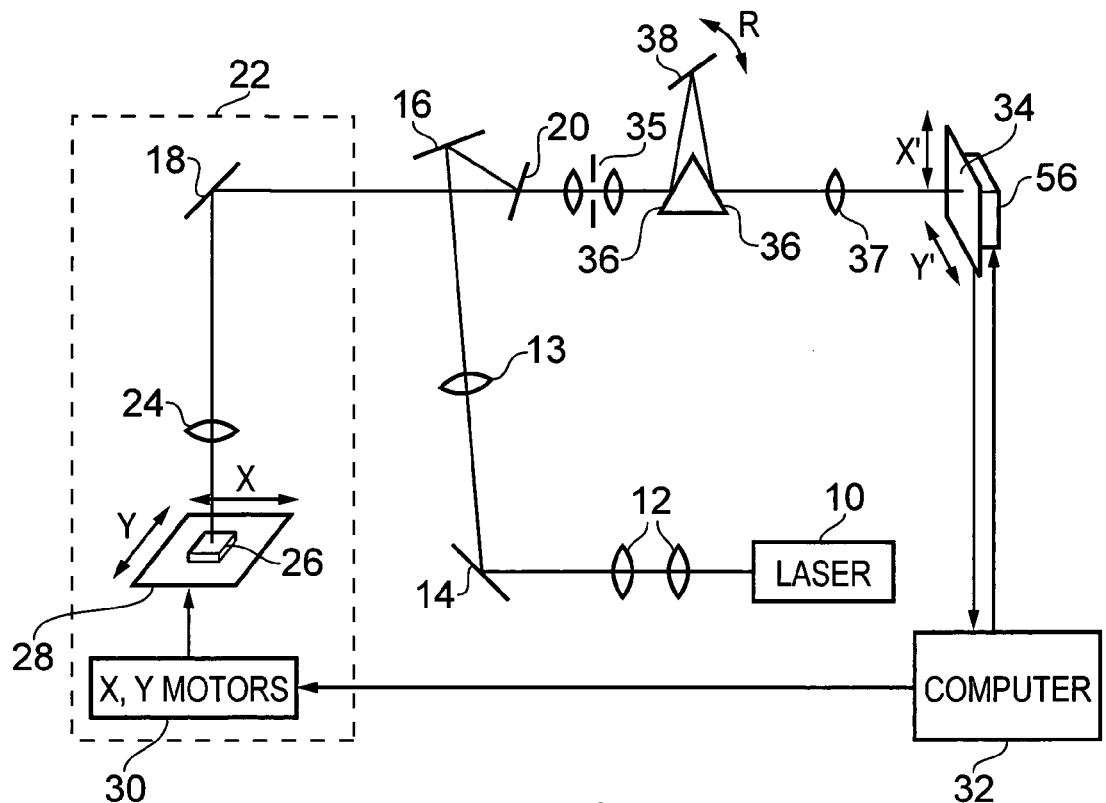
FIG. 1 is a schematic diagram of spectroscopic apparatus.

Referring to FIG. 1, the spectroscopic apparatus comprises a laser 10 which acts as a source of exciting light. This is passed via a beam expander 12, a lens 13, mirrors 14,16,18 and a filter 20 into a microscope 22. An objective lens 24 of the microscope 22 focuses the laser beam onto a sample 26 mounted on a stage or table 28. The stage 28 has motors 30 by which it can be moved in directions X and Y, under the control of a computer 32.

The illumination by the exciting laser beam generates scattered light, e.g. Raman scattered light at different frequencies/wavenumbers. This is collected by the microscope objective 24 and directed towards a two-dimensional photodetector array 34. It passes via the mirror 18, filter 20, a slit 35 (which may act confocally to control the depth resolution of the instrument), mirrors 36, a diffraction grating 38 and a focussing lens 37.

The preferred two-dimensional photodetector 34 is a commercially available CCD detector. However, other detectors are possible. The diffraction grating 38 disperses the spectrum of scattered light across the surface of the CCD 34, in a direction X', at a desired high spectral resolution. It is motorised to rotate as indicated by an arrow R, under the control of the computer 32, so as to move the spectrum on the CCD 34 in the direction X'

The filter 20 serves a dual purpose. Firstly, it reflects the exciting laser illumination from the laser 10, so as to inject it into the optical path towards the microscope 22 and sample 26. Secondly, it rejects Rayleigh scattered light having the same frequency as the illuminating laser beam and passes only the Raman spectrum of interest towards the CCD detector 34. A variety of different types of dielectric filter having such properties may be used, including for example a holographic filter (which may be placed at a low angle of incidence to the optical path as shown). If desired, more than one such filter may be provided in series, to improve the rejection of Rayleigh scattered light.

Many of the features of the arrangement described so far are to be found in U.S. Pat. No. 5,689,333, which is incorporated herein by reference for further details.

Figure 2:
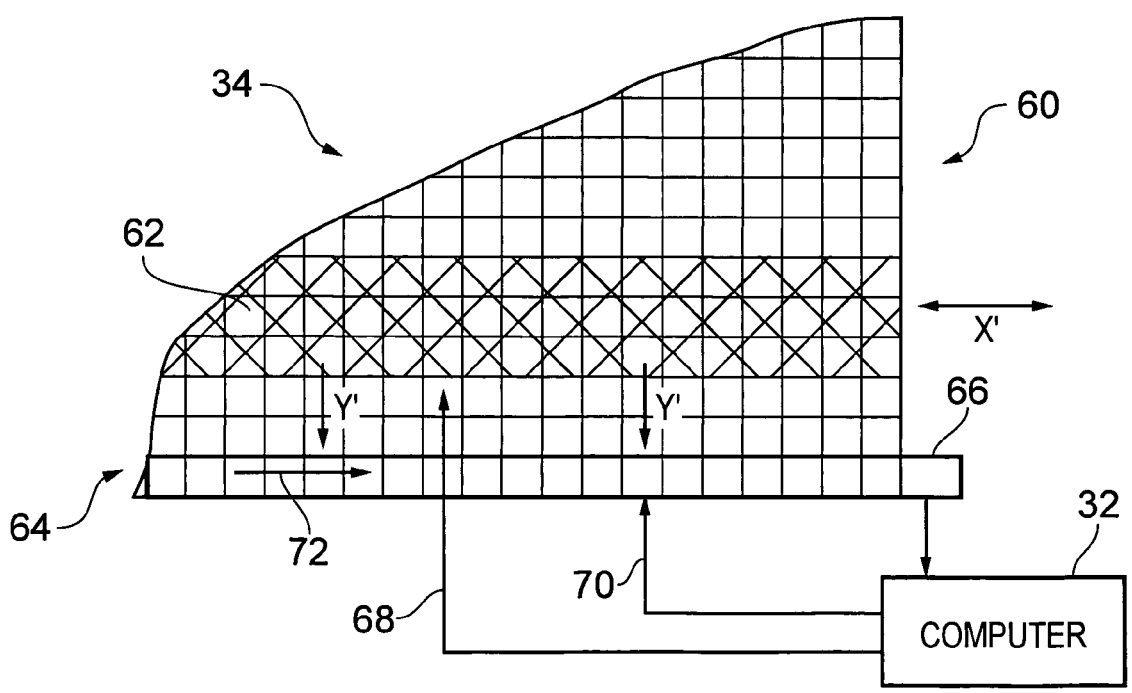
FIG. 2 shows part of a CCD detector.

FIG. 2 represents a part of the CCD detector 34. It comprises a two-dimensional array of detector elements 60, across which the spectrum 62 is dispersed in the direction X' (represented as a cross-hatched band). The spectrum may be focused onto just one row of detector elements, but would commonly be incident on two, three or more adjacent rows as shown.

At one edge, parallel with the direction of dispersion X', the CCD comprises an output register 64, having a row of storage elements. At one end, the output register has an output circuit 66 which reads the data out into the computer 32. The operation of the CCD is under the control of the computer 32, via control lines 68, 70. The line 68 causes data in the detector elements to be shunted row by row towards the output register 64, in the direction Y'. The line 70 causes data in the output register to be shunted towards the output circuit 66, as indicated by the arrow 72, parallel to X'.

The operation of the apparatus is as follows. The detector elements are exposed to the spectrum 62, and charge accumulates in them accordingly. This is then shifted row by row towards corresponding storage elements of the output register 64, by control signals on line 68. Where several adjacent rows are exposed to the spectrum, as shown, they are binned together into the corresponding output register elements at this time.

Next, the diffraction grating 38 is rotated (under computer control) to move the spectrum in the direction X' (towards the right as seen in FIG. 2). Simultaneously and synchronously with this, the computer causes the charge in the output register elements to move in the direction of the arrow 72 by the same amount. The whole process is then repeated. Thus, the charge from a given wavenumber within the spectrum continues to accumulate as it moves through the output register, synchronously with the movement of the spectrum.

In practice, there do not need to be discrete movements of the grating 38; it can move continuously at an appropriate speed, with the movements of data in the CCD chip in the directions Y' and 72 controlled to match. All the data is read sequentially into the computer 32, via the output circuit 66.

It is possible to shutter the CCD between movements, though in practice we have found this to be unnecessary.

The method described has the advantage of collecting data uniformly, without the need to stitch parts of the spectrum together subsequently in the computer. Furthermore, since each pixel in the spectrum is read out of the CCD only once, readout noise is added to each pixel only once.

These advantages can be achieved with the CCD 34 oriented orthogonally to that in U.S. Pat. No. 5,689,333, allowing it to be used in other ways such as described in our publication number WO 2008/090350.

In practice, it is desirable to ensure that the spectrum 62 is incident on the CCD as near as possible to the output register. This is because it is necessary to bin the blank rows between the spectrum and the output register in with the desired signal. To reduce noise, e.g. from cosmic rays, it is desirable to bin as few empty rows as possible for each shift of the output register. In practice, there may be, say, ten blank rows and two rows of containing the spectrum. The control on line 68 then bins twelve rows for each single shift of the output register controlled by line 70.

After binning these twelve rows into the output register, the entire detector array may be charge cleared, to get rid of any accumulated noise. This may be performed by shifting the charge up, away from the output register, by thirteen rows. More generally, if charge is shifted into the output register using n row transfers, then the clearing step is performed with n+1 row transfers away from the output register. In this way, the unused part of the CCD is slowly but continually cleared away from the area used.

In an alternative arrangement, it is possible to focus the spectrum directly onto the output register 64, so that light is detected by the elements of the output register themselves, with no vertical charge transfer. The spectrum is then moved as above, synchronously with the movement of charge through the output register, so that the charge from a given wavenumber accumulates as previously.

If desired, it is possible to phase synchronise the acceptance of the spectrum and the charge clearing with flashing of the laser illumination of the sample on and off. For example, if the sample is subject to undesired fluorescence as well as the desired Raman scattering, then this enables reduction of the fluorescence signal (which will persist after the illumination ceases.) Or the fluorescence can be measured separately from the Raman signal during the "off" period, and later subtracted in the computer. That can be done using a CCD having two output registers, one above and one below the region of interest. The Raman signal is shifted into one of the registers, and then the fluorescence signal into the other.

The invention claimed is:

1. Spectroscopic apparatus comprising:
    a light source for illuminating a sample so as to produce therefrom a spectrum of scattered light;
    a detector for detecting the scattered light; the detector comprising at least one column or row of detector elements each of which accumulate data in accordance with the intensity of light incident thereon, and an output register comprising a row of storage elements for receiving data from the detector elements; and
    a dispersive device for analysing the spectrum received from the sample and dispersing it along the detector;
    wherein:
    the output register is arranged parallel to the direction of dispersion;
    the apparatus is arranged to move the dispersive device such that the spectrum moves in the direction of dispersion; and
    the apparatus is also arranged to move the data from one storage element of the output register to the next, so that data for a given wavenumber within spectrum continues to accumulate as it moves through the output register, synchronously with the movement of the spectrum.

2. Spectroscopic apparatus according to claim 1, wherein the apparatus is arranged to expose the row or column of detector elements to at least a part of the spectrum and to read data from the column or row of detector elements into corresponding storage elements of the output register.

3. Spectroscopic apparatus according to claim 2, wherein the exposure is repeated and data is read into corresponding storage elements of the output register while the spectrum moves.

4. Spectroscopic apparatus according to claim 1, wherein the dispersive device moves continuously.

5. Spectroscopic apparatus according to claim 1, wherein the detector comprises a two-dimensional array of detector elements.

6. Spectroscopic apparatus according to claim 5, wherein the detector is a charge-coupled device.

7. Spectroscopic apparatus according to claim 6 arranged to charge-clear an unused part of the charge-coupled device.

8. Spectroscopic apparatus according to claim 5, wherein a plurality of rows or columns of detector elements are exposed to the spectrum and data from the plurality of rows or columns is binned together in the output register.

9. Spectroscopic apparatus according to claim 8 wherein the apparatus is arranged to shift data from a second set of rows or columns of detector elements away from the output register, after data from a first set of rows or columns of detector elements has been binned together in the output register.

10. Spectroscopic apparatus according to claim 5 arranged to charge-clear the detector array.

11. Spectroscopic apparatus according to claim 10 arranged to charge-clear the entire detector array.

12. Spectroscopic apparatus according to claim 10 wherein charge is cleared from the detector by shifting the charge away from the output register.

13. Spectroscopic apparatus according to claim 5 arranged to shift data from n rows or columns into the output register, and then to charge clear n+1 rows or columns of the detector array.

14. A method of operating a spectroscopic apparatus comprising a light source for illuminating a sample so as to produce therefrom a spectrum of scattered light, a detector for detecting the scattered light, the detector comprising at least one column or row of detector elements each of which accumulate data in accordance with the intensity of light incident thereon, and an output register comprising a row of storage elements for receiving data from the detector elements, and a dispersive device for analysing the spectrum received from the sample and dispersing it along the detector, wherein the output register is arranged parallel to the direction of dispersion, the method comprising:

exposing the at least one column or row of detector elements to a spectrum of scattered light;

shifting data from the at least one column or row of detector elements into the output register;

moving the dispersive device such that the spectrum of scattered light moves in the direction of dispersion; and moving the data from one storage element of the output register to the next, so that the data for a given wavenumber within the spectrum continues to accumulate as it moves through the output register, synchronously with the movement of the spectrum of scattered light.

15. A method according to claim 14, the method further comprising charge clearing the detector array.

16. A method according to claim 15, wherein clearing the detector array comprises shifting the charge away from the output register.

17. A method according to claim 14, the detector of the spectroscopic apparatus comprising a two-dimensional array of detector elements, wherein exposing the at least one column or row of detector elements to a spectrum of scattered light comprises exposing a first set of rows or columns of detector elements to the spectrum of scattered light, and wherein shifting data from the at least one column or row of detector elements into the output register comprises binning data from the first set of rows or columns together in the output register.

18. A method according to claim 17, the method further comprising:

shifting data from a second set of rows or columns of detector elements away from the output register, after data from the first set of rows or columns of detector elements has been binned together in the output register.

* * * * *